United States Patent
Martín Hernández et al.

(10) Patent No.: US 11,204,073 B2
(45) Date of Patent: Dec. 21, 2021

(54) ELASTIC JOINT

(71) Applicant: TEJASA-TC, S.L.L., Astillero (ES)

(72) Inventors: Juan José Martín Hernández, Astillero (ES); Alejandro Pérez Núñez, Astillero (ES)

(73) Assignee: TEJASA-TC, S.L.L, Astillero (ES)

( * ) Notice: Subject to any disclaimer, the term of this patent is extended or adjusted under 35 U.S.C. 154(b) by 69 days.

(21) Appl. No.: 16/605,218

(22) PCT Filed: Apr. 14, 2018

(86) PCT No.: PCT/ES2018/070304
§ 371 (c)(1),
(2) Date: Oct. 15, 2019

(87) PCT Pub. No.: WO2018/193141
PCT Pub. Date: Oct. 25, 2018

(65) Prior Publication Data
US 2020/0040957 A1 Feb. 6, 2020

(30) Foreign Application Priority Data
Apr. 16, 2017 (ES) .................................. 201730618

(51) Int. Cl.
*F16F 1/36* (2006.01)
(52) U.S. Cl.
CPC .................. *F16F 1/3605* (2013.01)
(58) Field of Classification Search
CPC .. F16F 1/28; F16F 1/3605; F16F 1/362; F16F 1/38; F01N 13/1811

USPC ............................ 267/147; 285/49, 235, 234
See application file for complete search history.

(56) References Cited

U.S. PATENT DOCUMENTS

| | | | |
|---|---|---|---|
| 2,482,488 A * | 9/1949 | Julien | F16F 3/00 267/33 |
| 2,658,710 A | 11/1953 | Titus | |
| 3,073,557 A | 1/1963 | Da Vis | |
| 3,250,502 A | 5/1966 | Robinson | |
| 3,390,709 A | 7/1968 | Schmidt | |

(Continued)

FOREIGN PATENT DOCUMENTS

| | | | | |
|---|---|---|---|---|
| DE | 102019113895 A1 * | 11/2020 | ............ | F16H 57/025 |
| EP | 0750131 A1 * | 12/1996 | .............. | F16F 7/108 |

(Continued)

*Primary Examiner* — Melanie Torres Williams
(74) *Attorney, Agent, or Firm* — Adam Warwick Bell; Matthew Rupert Kaser

(57) ABSTRACT

Elastic joint comprising:—an inner ring (1) provided with an axial opening (11) for being mounted on a shaft "E" and with an outer surface having: two opposite intermediate sections (13) having a decreasing cross-section towards opposite ends of said inner ring (1) and forming supporting zones for the metal wire cushions (3), and two end sections (14) having a smaller cross-section than the central section;—an outer ring (2) provided with an outer cylindrical surface (21) for mounting the ring to on a support (S) and with an inner surface with two intermediate portions (22) having a decreasing cross-section towards opposite ends of the outer ring (2), facing the intermediate sections (13) of the inner ring (2); and—metal wire cushions (3) arranged between the inner ring and the outer ring (2).

8 Claims, 3 Drawing Sheets

(56) References Cited

U.S. PATENT DOCUMENTS

| | | | | |
|---|---|---|---|---|
| 4,747,624 | A | * | 5/1988 | Faber .................. F01N 13/1811 |
| | | | | 277/625 |
| 4,892,444 | A | * | 1/1990 | Moore .................. E02B 17/003 |
| | | | | 405/195.1 |
| 5,133,578 | A | * | 7/1992 | Whightsil, Sr. ....... E21B 17/085 |
| | | | | 285/146.2 |
| 5,286,132 | A | * | 2/1994 | Morini ...................... B61F 5/32 |
| | | | | 403/162 |
| 2008/0136071 | A1 | * | 6/2008 | Weisbeck ................ F16F 1/393 |
| | | | | 267/136 |

FOREIGN PATENT DOCUMENTS

| | | | | |
|---|---|---|---|---|
| EP | 2180203 | A2 | * | 4/2010 ............ F16F 3/0935 |
| WO | WO-2020010069 | A1 | * | 1/2020 ............... D01F 9/22 |

* cited by examiner

ELASTIC JOINT

OBJECT OF THE INVENTION

The object of the present invention is an elastic joint used to prevent premature wear of machines and to prevent stoppages or breakdowns, which has the characteristic of being made entirely of metal material and which has particular constructive features aimed at preventing the generation of noise and the transmission of vibrations during its operation.

TECHNICAL FIELD

This elastic joint is applicable to all types of equipment and installations that must withstand radial, axial, torsional or conical stresses, such as: explosion engines, commercial vehicles, trains, etc., on the shaft or overarm of all types of machines or of all types of transport elements, being installed on the support shaft that connects the wheel with the engine suspension or with the vehicle chassis by means of an elastic joint; or at both ends of the shock absorbers of the vehicles; and on any other machine or installation requiring a joint.

STATE OF THE ART

Different elastic joints are currently used to replace certain mechanical joints, such as ball bearings, which have higher rigidity and do not absorb the high-frequency vibrations, which are those having more energy and therefore likely to cause greater damage to the parts to be insulated.

Depending on the way they are mounted on machines or transport elements, these joints can be subjected to forces in a single direction or to forces with vector components in various directions, such as: axial, radial, conical and torsional.

Elastic joints comprising too concentrically arranged metal cylindrical reinforcements and a mass of elastomeric material, usually rubber, compressed between the two reinforcements, are known in the state of the art.

The problem with these elastic joints that comprise a mass of elastomeric material is that they do not withstand the high temperatures that are generated in the operation of certain machines or transport elements; or to which such machines can be subjected when working in hot areas, such as foundries or furnace areas. For example, rubber withstands a maximum of 80° C. Another drawback is that rubber generally deteriorates when in contact with acids or chemicals and cannot be used to withstand high loads.

To solve the above problems there are certain metal joints on the market, such as that described in U.S. Pat. No. 2,658,710 wherein a cylinder-shaped shock absorber with a central drill is placed on the shaft or supporting element.

The problem with these joints is that they are suitable for absorbing stress only in the axial direction and do not provide suitable damping against radial, oblique or torsional loads.

European patent EP2 077 402 (HUTCHINSON, S. A.) describes a damper for an aerospace structure made up of an annular chamber with compartments, each of these compartments being filled by a wire mesh metal cushion, completing the device with a damping fluid filling the annular chamber and the interstices between the wire mesh.

This elastic joint is complex to manufacture due to the incorporation of the damping fluid and the need to incorporate radial shaft seals or hydraulic seals to prevent fluid leakage over time.

In addition, this joint has only axial elasticity, and does not provide suitable angular, torsional, or radial elasticity. In this state of the art document, the stiffness is provided by the cushion while damping is provided by fluid.

U.S. Pat. No. 2,729,442 discloses a joint with deformable cushions to be arranged between rotatory elements, formed by an outer sleeve and a square-shaped inner sleeve, between which deformable cushions are arranged.

DESCRIPTION OF THE INVENTION

The elastic joint object of the invention has particular constructive features aimed at providing it with a high construction simplicity, as it is made entirely of metallic materials, being able to be used to withstand high loads and high temperatures, not experiencing deterioration with the contact of chemicals.

According to the invention, this elastic joint comprises:

an inner ring provided with an axial opening for mounting the joint on a shaft to be damped and an outer surface having at least: two opposing intermediate sections having a decreasing cross-section towards opposite ends of said inner ring; and two end sections having a smaller cross-section than the connection point of the intermediate sections;

an outer ring formed by at least two pieces facing in the axial or radial direction, and having: an outer surface for mounting the joint on a support to be damped and an inner surface with two intermediate portions of decreasing cross-section towards the opposite ends of the outer ring and facing the opposing lateral sections of the inner ring; and metal wire cushions, conforming damping and anti-friction means, arranged between the intermediate sections of the inner ring and the intermediate portions of the outer ring.

These metal wire cushions, preferably, have a square shape and are distributed around the intermediate sections of the inner ring, forming a plurality of contact points between said inner ring and the outer ring. These metal wire cushions can withstand high loads and, as they are metallic provide damping without being affected by temperature.

The intermediate sections of the inner ring may have different shapes, such as truncated cone shape or polygonal truncated pyramid shape, and different inclinations in order to provide different damping levels, always depending on the type of stress to be withstood: axial, radial, oblique or torsional.

In one embodiment of the invention, the intermediate sections of the inner ring have planes or recesses forming seating and stabilising areas for the metal wire cushions to withstand the torsional force.

Both the intermediate sections of the inner ring and the intermediate portions of the outer ring are delimited at their opposite ends by protrusions that form retaining stops for the metal wire cushions in the position of use of the joint.

In one embodiment of the invention, the outer ring is made up of two ring pieces intended to be mounted at opposite ends of the inner ring and attached by screwing into the mounting position of the joint. This mounting by screwing allows varying the compressive force to which the wire cushions arranged between the inner ring and the outer ring are subjected; thus achieving a greater or lesser compaction of the aforementioned elastic wire cushions; and consequently, a variation of the deformation strength of the elastic joint facing different forces: radial, axial, conical and torsional.

In an embodiment variant, the outer surface for mounting the joint on the support to be damped is cylindrical.

In an embodiment variant of the invention, it has been provided that the inner ring is arranged between the intermediate sections of a cylindrical central section; the joint comprising additional metal wire cushions mounted on said central section that significantly increase the strength of the joint to radial loads.

DESCRIPTION OF THE FIGURES

In order to complement the description that is being carried out and with the purpose of facilitating the understanding of the features of the invention, the present description is accompanied by a set of drawings wherein, by way of a non-limiting example, the following has been represented.

PREFERRED EMBODIMENT OF THE INVENTION

In the example embodiment shown in the accompanying figures, the elastic joint of the invention comprises: an inner ring (1), an outer ring (2) and metal wire cushions (3) arranged between the two and forming damping and anti-friction means.

Figure 4:
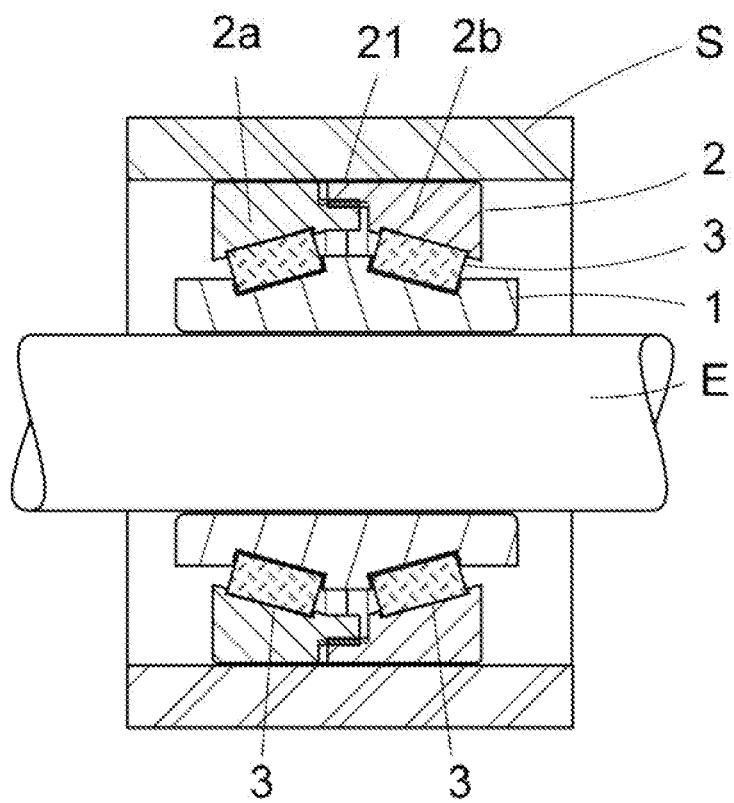
FIG. 4 shows an elevational view of the elastic joint of the previous figures mounted and sectioned along a vertical plane and in position of use.

The inner ring (1) is provided with an axial opening (11) for mounting the joint on a shaft "E", as shown in FIG. 4, and with an outer surface having: a central section (12); two opposing intermediate sections (13) having a decreasing cross-section towards opposite ends of said inner ring (1); and two end sections (14) having a smaller cross-section than the central section.

The two intermediate sections (13) of the inner ring form zones for supporting the metal wire cushions (3), which, in the position of use of the joint shown in FIG. 4, are arranged between said inner ring (1) and the outer ring (2).

Figure 1:
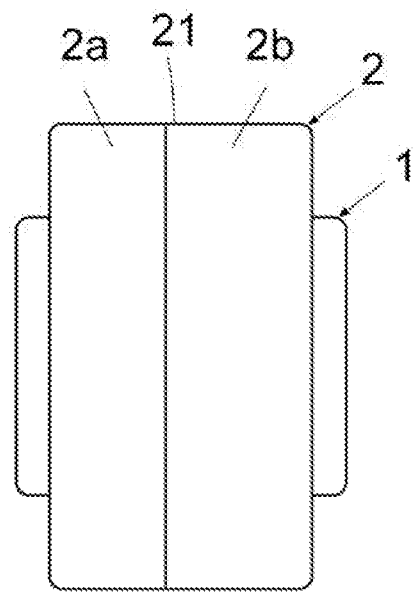
FIG. 1 shows a front elevational view of an embodiment example of the elastic joint according to the invention.
Figure 2:
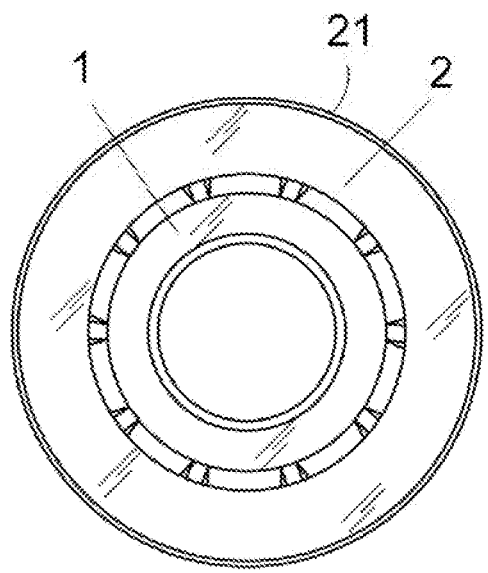
FIG. 2 shows a side view of the elastic joint of the previous figure.
Figure 3:
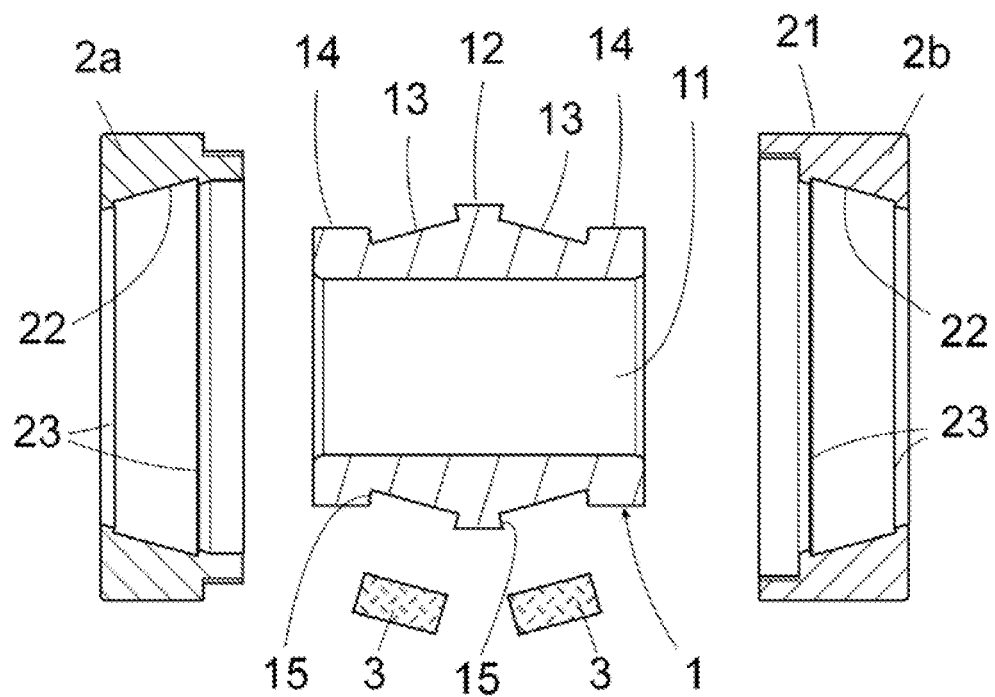
FIG. 3 shows an exploded elevational view of the inner and outer rings of the joint and of two of the metal wire cushions mounted between the intermediate sections of the inner ring and the intermediate portions of the outer ring; the outer ring being formed by two annular pieces, which can be attached by screwing, which have been depicted uncoupled.

In the embodiment example shown in FIGS. 3 and 4, the intermediate sections (13) of the inner ring (1) have a truncated cone configuration and are delimited by protrusions (15) forming retaining stops for the metal wire cushions (3) in the position of use of the elastic joint.

Figure 5:
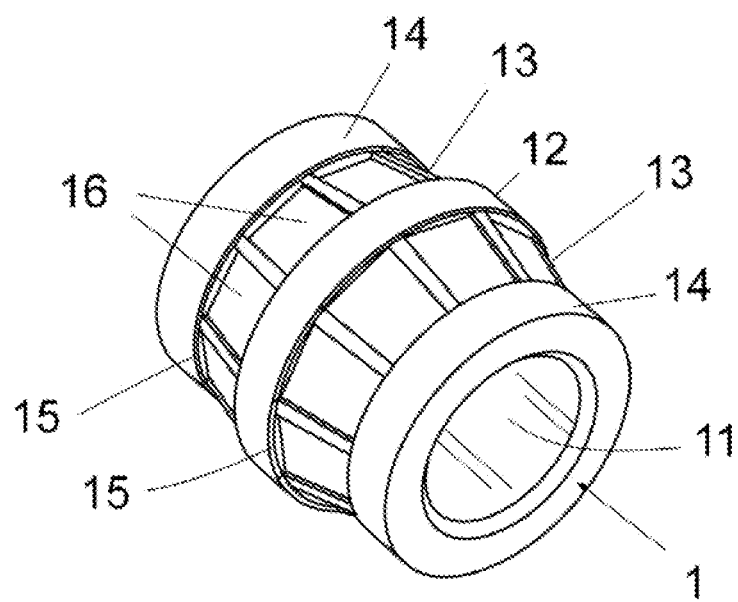
FIG. 5 shows a perspective view of an embodiment variant of the inner ring having, in the intermediate sections, seats for mounting the metal wire cushions.

In the embodiment variant shown in FIG. 5, the intermediate sections (13) have a series of recesses (16) forming seating and stabilising areas for the metal wire cushions (3).

In the example embodiment shown in FIGS. 1 to 4, the outer ring (2) has a cylindrical outer surface (21) for mounting the joint on a support (S) to be damped, as shown in FIG. 4; and an inner surface with two intermediate portions (22) of decreasing cross-section towards the opposite ends of the outer ring (2) and facing the intermediate sections (13) of the inner ring (1).

These intermediate portions (22) having a truncated cone configuration, form the contact surfaces of the outer ring (2) with the metal wire cushions (3). Said intermediate portions (22) are delimited by protrusions (23) forming retaining stops for the metal wire cushions (3).

In the embodiment shown in FIGS. 3 and 4, the outer ring (2) is formed by two annular pieces (2a, 2b) facing in an axial direction and having at opposite ends complementary threaded portions for their mutual attachment by screwing, in the position of use, as shown in FIG. 4.

Figure 6:
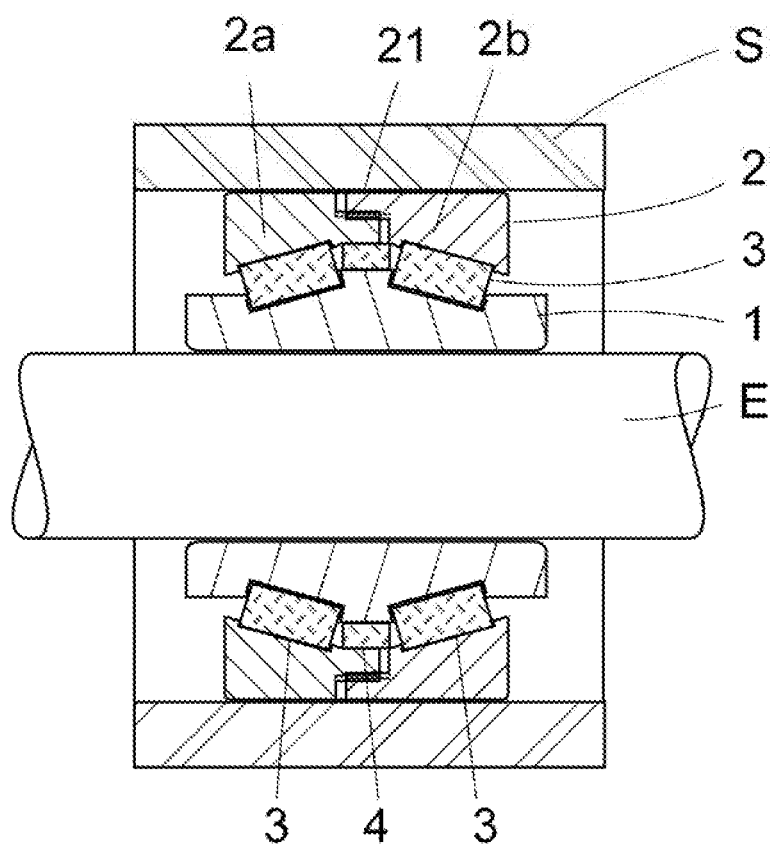
FIG. 6 shows an elevational view, sectioned by a vertical plane and in position of use, of an embodiment variant of the elastic joint according to the invention, incorporating additional metal wire cushions arranged between the central section of the inner ring and the outer ring.

In the embodiment variant shown in FIG. 6, in addition to the metal wire cushions (3) arranged on the intermediate sections (13) of the inner ring (1), the joint has additional metal wire cushions (4) mounted on the cylindrical central section (12) of the inner ring (1). Said additional cushions (4) make it possible to increase significantly the strength of the joint to radial loads.

Once the nature of the invention as well as an example of preferred embodiment have been sufficiently described, it is stated for all pertinent purposes that the materials, form, size and arrangement of the elements described are susceptible to changes, provided these do not involve an alteration of the essential features of the invention that are claimed subsequently.

The invention claimed is:

1. An elastic joint comprising: an inner ring (1) provided with an axial opening (11) for mounting the joint on a shaft "(E)" and an outer ring (2) provided with an outer surface (21) for mounting the joint on a support (S) to be damped and metal wire cushions (3) arranged between the inner ring and the outer ring (2) and forming damping and anti-friction means; characterised in that: the inner ring (1) comprises an outer surface having:
    two opposite intermediate sections (13) having a decreasing cross-section towards opposite ends of said inner ring (1) and forming supporting zones for the metal wire cushions (3), and two end sections (14); and the outer ring (2) has an inner surface with two intermediate portions (22) having a decreasing cross-section towards opposite ends of the outer ring (2), facing the intermediate sections (13) of the inner ring (2) and forming the contact surfaces of the outer ring (2) with the metal wire cushions (3).

2. The elastic joint, according to claim 1, characterised in that the intermediate sections (13) of the inner ring (1) have a truncated cone or truncated pyramid configuration and are delimited by protrusions (15) forming retaining stops for the metal wire cushions (3) in the position of use of the elastic joint.

3. The elastic joint, according to claim 1, characterised in that the intermediate portions (22) of the outer ring (2) are delimited by protrusions (23) forming retaining stops for the metal wire cushions (3).

4. The elastic joint, according to claim 1, characterised in that the intermediate sections (13) of the inner ring (1) have a series of recesses (16) forming seating and stabilising areas for the metal wire cushions (3).

5. The elastic joint, according to claim 1, characterised in that the outer ring (2) is formed by two annular pieces (2a, 2b) facing in an axial direction and having at opposite ends complementary threaded portions for their attachment by screwing and for adjustable tightening of the cushions (3).

6. The elastic joint, according to claim 1, characterised in that the inner ring (1) comprises a central section (12) arranged between the intermediate sections (13).

7. The elastic joint, according to claim 6, characterised in that it comprises additional metal wire cushions (4) mounted between the central section (12) of the inner ring (1) and a central area of the outer ring (2).

8. The elastic joint, according to claim 1, characterised in that the outer surface (21) for mounting the joint on the support (S) to be damped is cylindrical.

\* \* \* \* \*